O. DANN.
Hand-Seeder.
No. 58,993. Patented Oct 23, 1866.
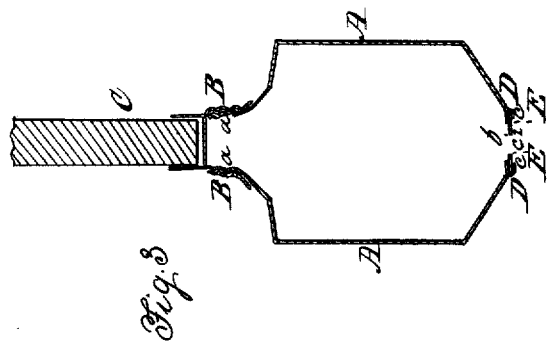
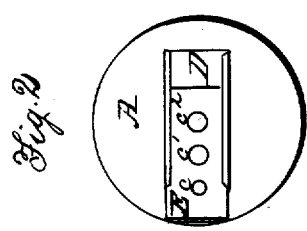
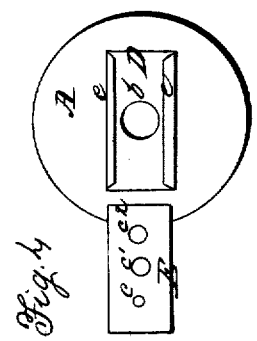
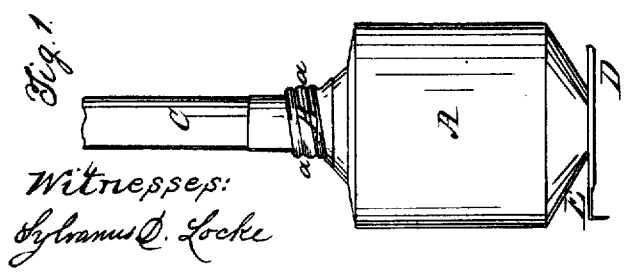
Witnesses:
Sylvanus D. Locke
Inventor:
Obed Dann

UNITED STATES PATENT OFFICE.

OBED DANN, OF JANESVILLE, WISCONSIN.

IMPROVEMENT IN HAND SEED-SOWERS.

Specification forming part of Letters Patent No. 58,993, dated October 23, 1866.

*To all whom it may concern:*

Be it known that I, OBED DANN, of the city of Janesville, in the county of Rock and State of Wisconsin, have invented a new and Improved Device for Sowing Seeds by Hand; and I do hereby declare that the following is a full and exact description thereof, reference being had to the accompanying drawings, making a part of this specification, in which—

Figure 1 is an elevation of my device. Fig. 2 is a bottom view. Fig. 3 is a vertical section at right angles to Fig. 1; and Fig. 4 is also a bottom view, showing the slide withdrawn.

The nature of my invention consists in providing a circular or other shaped box, made of tin or any other light material, with a large opening or orifice in the bottom for the emission of seeds, and closing, or partly closing, this orifice with a slide pierced with a series of different-sized holes, each of which is of the proper size for sowing a certain kind of seed, so allowing any desired kind of seed to be sown by simply shoving in or drawing out the slide, so that the requisite hole shall come directly over or cover the orifice in the bottom of the box, and in so constructing a screw cap or cover to the box that the cap itself shall form a socket for the reception of a handle for operating the box.

To enable others skilled in the art to make and use my invention, I will proceed to describe its construction and operation.

The box A is of any desired form or size, and of any suitable material; but I prefer an ordinary circular tin can of the form shown and holding about a pint. This can or box A, I pierce with a large opening or orifice, *p*, for the emission of the seed. This opening is covered by a slide, E, that is pierced with a series of smaller different-sized holes, so arranged that only one of them at a time can be brought to cover the opening *b*. These holes are so graduated in size that each one of them is designed for a certain kind of seed different from the others.

The cover or cap B screws onto the top of the box, as shown at *a*, Figs. 1 and 3, and forms a socket for the handle C, into which the latter is secured by being driven. The handle C should be of sufficient length to allow the operator, when standing upright, to reach, or very near reach, the ground with the box.

To operate my device three conditions are requisite: first, that the box A be filled with the seed, which is done by removing the cap B; second, that the slide E be so placed that the proper hole shall cover the opening *b*; and, third, that the ground be marked in shallow furrows of the depth and distance apart desired. These conditions being complied with, the operator seizes the end of the handle C and walks rapidly forward, holding the box A directly over and within a few inches of the furrow, and, by quick, sharp vertical movements of the hand, rapidly shaking it, so as to allow the seeds to fall into the furrow. The frequency of these movements or shakes will depend altogether upon the distance it is desired the seeds should be apart.

The specific advantages claimed for this device arise from its extreme simplicity, cheapness, and efficiency, as with one of these sowers, which any tinman can make at a cost of only a few cents, any farmer or gardener having his ground marked or furrowed can readily and easily sow an acre of onions or beets in a day.

What I claim as new, and desire to secure by Letters Patent of the United States, is—

1. The combination of the box A and slide E, when constructed, arranged, and used substantially as and for the purpose set forth.

2. The combination of the box A, cap B, and handle C, when constructed, arranged, and used substantially as and for the purpose set forth.

3. The combination of the box A, slide E, cap B, and handle C, when constructed, arranged, and used substantially as and for the purpose set forth.

OBED DANN.

Witnesses:
S. D. LOCKE,
H. S. WOODRUFF.